US012682634B2

(12) United States Patent
Sakong et al.

(10) Patent No.: US 12,682,634 B2
(45) Date of Patent: Jul. 14, 2026

(54) ROAD EXTRACTION DEVICE AND METHOD

(71) Applicant: Meissa Planet Inc., Seoul (KR)

(72) Inventors: Yonghyub Sakong, Seoul (KR); Hyun Sun Park, Seoul (KR); Dong Young Kim, Seoul (KR)

(73) Assignee: Meissa Planet Inc., Seoul (KR)

( * ) Notice: Subject to any disclaimer, the term of this patent is extended or adjusted under 35 U.S.C. 154(b) by 276 days.

(21) Appl. No.: 18/395,297

(22) Filed: Dec. 22, 2023

(65) Prior Publication Data

US 2025/0086966 A1    Mar. 13, 2025

(30) Foreign Application Priority Data

Sep. 8, 2023    (KR) ......................... 10-2023-0119685

(51) Int. Cl.
| | |
|---|---|
| *G06V 20/10* | (2022.01) |
| *G06V 10/26* | (2022.01) |
| *G06V 10/70* | (2022.01) |
| *G06V 10/771* | (2022.01) |
| *G06V 10/80* | (2022.01) |
| *G06V 10/82* | (2022.01) |
| *G06V 10/96* | (2022.01) |
| *G06V 20/13* | (2022.01) |
| *G06V 10/44* | (2022.01) |
| *G06V 10/54* | (2022.01) |

(52) U.S. Cl.
CPC ............ *G06V 20/182* (2022.01); *G06V 10/26* (2022.01); *G06V 10/70* (2022.01); *G06V 10/771* (2022.01); *G06V 10/80* (2022.01); *G06V 10/82* (2022.01); *G06V 10/96* (2022.01); *G06V 20/13* (2022.01); *G06V 10/44* (2022.01); *G06V 10/54* (2022.01); *G06V 2201/08* (2022.01)

(58) Field of Classification Search
None
See application file for complete search history.

(56) References Cited

U.S. PATENT DOCUMENTS

| | | | | |
|---|---|---|---|---|
| 2017/0177933 A1* | 6/2017 | Mittal | ..................... | G06F 18/22 |
| 2021/0232832 A1* | 7/2021 | Damerow | ............ | G06N 3/0464 |
| 2024/0420487 A1* | 12/2024 | Wang | ................... | G06V 10/776 |

FOREIGN PATENT DOCUMENTS

| | | | | | |
|---|---|---|---|---|---|
| KR | 20230047040 A | * | 4/2023 | ...... | B60W 30/18159 |

OTHER PUBLICATIONS

Chen, X.—"GA-Net: A geometry prior assisted neural network for road extraction"—Elsevier 2022—pp. 1-11 (Year: 2022).*
Liebel, L.—"A Generalized Multi-Task Learning Approach to Stereo DSM Filtering in Urban Areas"—arXiv 2020—pp. 1-17 (Year: 2020).*

* cited by examiner

*Primary Examiner* — Bernard Krasnic
(74) *Attorney, Agent, or Firm* — AEON Law, PLLC; Adam L.K. Philipp; Ki Yong O

(57) ABSTRACT

A road extraction device and method comprising: a data collection module configured to collect a road image associated with a road; and a deep learning module configured to perform a task for extracting the road from the road image by using deep learning technology, wherein the deep learning module comprises: a first deep learning unit configured to perform segmentation on the road image; and a second deep learning unit configured to perform object detection on the road image.

4 Claims, 12 Drawing Sheets

<u>1</u>

100

300

200

Communication
Network

External Database

Road Extraction Device

ROAD EXTRACTION DEVICE AND METHOD

GOVERNMENT SUPPORT CLAUSE

This invention has been supported by the Ministry of Trade, Industry and Energy, and the Defense Acquisition Program Administration (Agency for Defense Development Cooperation). The notice number or announcement number of the research project is 2022-DC-2, and the name of the research project is "Support for Commercialization of Defense Technologies". The research project number is 22-DC-IN-17, and the title of the research project is "Feasibility Study of 'Aerial Imagery-based AI Smart Construction Service' commercialization". The research period is from Dec. 1, 2022, to Nov. 30, 2024.

CROSS-REFERENCE TO RELATED APPLICATION

This application claims priority to and the benefit of Korean Patent Application No. 10-2023-0119685 filed on Sep. 8, 2023, in the Korean Intellectual Property Office the entire contents of which are incorporated herein by reference.

BACKGROUND

1. Field

The present disclosure relates to a road extraction device and method.

Specifically, the present disclosure relates to a road extraction device and method that may extract a road from a satellite image by using a deep learning model pre-trained through multi-task learning.

2. Description of the Related Art

The contents described in this part merely provide background information about the present embodiment and do not constitute the prior art.

Currently, hundreds of artificial satellites around the world are performing their own tasks for purposes such as meteorology, communication, broadcasting, agriculture, space development, and military. Satellite images captured from these satellites are public data and are used in various fields.

Since satellite images are images captured at very high altitudes, technology for processing, analyzing, and/or storing such satellite images by using deep learning technology has recently attracted attention.

In particular, such satellite images are often used to generate or update maps. In this case, there has been a sufficient need for technology to accurately extract the shapes of roads from satellite images in order to generate or update the maps.

The description set forth in the background section should not be assumed to be prior art merely because it is set forth in the background section. The background section may describe aspects or embodiments of the disclosure.

SUMMARY

An object of the present invention is to provide a road extraction device and method that enables more accurate road extraction from satellite images by using a deep learning model pre-trained through multi-task learning.

Specifically, an object of the present disclosure is to a road extraction device and method in which some of autoencoders perform segmentation and others thereof perform object detection, wherein a plurality of decoders of an autoencoding model that performs segmentation are provided to perform different tasks.

In addition, an object of the present disclosure is to provide a road extraction device and method, which enable more accurate road extraction by additionally performing, in addition to tasks associated with road surface and road center line, tasks associated with texture representing the texture of the road, road edge representing the edge of the road, road angle (direction) representing the angle of the road, not-road marks (e.g., buildings, plants, and waters), and road marks (e.g., cars).

The objects of the present disclosure are not limited to those described above, and other objects and advantages of the present disclosure not described above can be understood from the following description and will be more clearly understood from embodiments of the present disclosure. In addition, it will be readily apparent that the objects and advantages of the present disclosure may be realized by means indicated in the claims and combinations thereof.

A road extraction device and method in accordance with some embodiments of the present disclosure has a new effect of enabling more accurate road extraction from satellite images by using a deep learning model pre-trained through multi-task learning.

Specifically, in the road extraction device and method in accordance with some embodiments of the present disclosure, some of autoencoders perform segmentation and others thereof perform object detection, wherein a plurality of decoders of an autoencoding model that performs segmentation are provided to perform different tasks.

In addition, the road extraction device and method in accordance with some embodiments of the present disclosure has a significant effect of enabling more accurate road extraction by additionally performing, in addition to tasks associated with road surface and road center line, tasks associated with texture representing the texture of the road, road edge representing the edge of the road, and road angle (direction) representing the angle of the road.

Furthermore, the road extraction device and method in accordance with some embodiments of the present disclosure has a new effect of further improving extraction accuracy by additionally performing tasks associated with not-road marks (e.g., buildings, plants, and waters), and road marks (e.g., cars).

According to some aspects of the disclosure, a road extraction device comprises a data collection module configured to collect a road image associated with a road; and a deep learning module configured to perform a task for extracting the road from the road image by using deep learning technology, wherein the deep learning module comprises, a first deep learning unit configured to perform segmentation on the road image, and a second deep learning unit configured to perform object detection on the road image.

According to some aspects, the road image comprises a satellite image associated with the road.

According to some aspects, the deep learning module is trained through multi-task learning.

According to some aspects, the deep learning module is configured to perform the task by using an autoencoder.

According to some aspects, the first deep learning unit and the second deep learning unit comprises at least one encoding unit configured to convert the road image into a latent representation by encoding the road image, which is input data, and at least one decoding unit configured to generate output data by converting the latent representation.

According to some aspects, at least one of the first deep learning unit and the second deep learning unit comprises a plurality of decoding units.

According to some aspects, each of the plurality of decoding units is pre-trained to perform different types of tasks.

According to some aspects, a $1^{st}$-1 decoding unit included in the first deep learning unit is configured to perform a task associated with at least one of road surface, road center line, texture representing a texture of the road, road edge representing an edge of the road, and road angle (direction) representing an angle of the road, a $1^{st}$-2 decoding unit included in the first deep learning unit is configured to perform a task associated with a not-road mark including at least one of a building, a plant, and water, and a second decoding unit included in the second deep learning unit is configured to perform a task associated with a road mark including a car.

According to some aspects, the road extraction device further comprises a post-processing module configured to generate final data by merging the tasks performed by the first deep learning unit and the second deep learning unit and then processing the merged tasks.

According to some aspects, when an unconnected area associated with the road exists, the post-processing module is configured to convert the unconnected area into a connected area.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

In addition to the above description, specific effects of the present disclosure will be described together while explaining specific details for carrying out the present disclosure.

BRIEF DESCRIPTION OF THE DRAWINGS

FIG. 5 is a conceptual diagram for describing the operation of the deep learning module in accordance with some embodiments of the present disclosure.

DETAILED DESCRIPTION OF THE EMBODIMENTS

Figure 1:
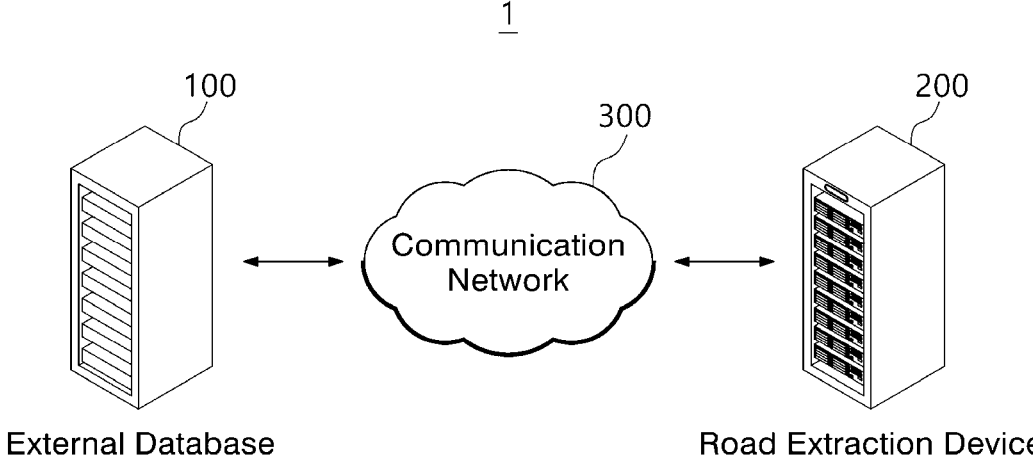
FIG. 1 illustrates a road extraction system in accordance with some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a road extraction device and method in accordance with some embodiments of the present disclosure will be described with reference to FIGS. 1 to 8.

FIG. 1 illustrates a road extraction system in accordance with some embodiments of the present disclosure.

Referring to FIG. 1, a road extraction system 1 in accordance with some embodiments of the present disclosure may include an external database 100, a road extraction device 200, and a communication network 300.

The external database 100 may be a database that stores, manages, and/or transmits original data to be subjected to road extraction.

As some examples, the external database 100 may be various types of electronic devices (e.g., computers, laptop PCs, mobile devices, or wearable devices), a workstation, a data center, an Internet data center (IDC), a direct attached storage (DAS) system, a storage area network (SAN) system, a network attached storage (NAS) system, and a redundant array of inexpensive disks or redundant array of independent disks (RAID) system, but embodiments of the present disclosure are not limited thereto.

The external database 100 may transmit, to the road extraction device 200, the original data on which the road extraction device 200 performs road extraction. In other words, the road extraction device 200 may receive the original data associated with road extraction from the external database 100.

The original data may refer to data to be subjected to road extraction. For example, the original data may include a video including road surface, a video frame, an image, a panorama, etc. In other words, the original data may include video data including road surface, video frame data, image data, panorama data, etc. However, embodiments of the present disclosure are not limited thereto.

Hereinafter, for convenience of explanation, the following description will be given on the assumption that the original data is a road image.

As an example, the road image may include a satellite image including road surface. The satellite image may refer to an image captured from an artificial satellite located at a certain height. In this case, the external database 100 may be a database that stores, analyzes, and/or manages satellite images that are public data.

The road extraction device 200 may extract the road from the road image. In other words, the road extraction device 200 may perform road extraction from the road image received from the external database 100.

In this case, the road extraction device 200 may be a workstation, a data center, an Internet data center (IDC), a direct attached storage (DAS) system, a storage area network (SAN) system, a network attached storage (NAS) system, and a redundant array of inexpensive disks or redundant array of independent disks (RAID) system, but embodiments of the present disclosure are not limited thereto.

As some examples, the road extraction device 200 may perform a task to extract the road from the road image by using deep learning technology.

At this time, the task may refer to a series of operations performed by a deep learning module. In other words, the task may refer to a series of processes or operations in which the deep learning module receives input values and outputs output values in order to derive a certain result.

For example, the road extraction device 200 may perform a task associated with computer vision on road images. In other words, the road extraction device 200 may perform a task associated with image analysis of road images.

For example, the road extraction device 200 may perform segmentation and object detection associated with road surface and/or characteristics of the road on the road image. At this time, the segmentation refers to a task of classifying which class each pixel in an image belongs to, and the object detection refers to a task of identifying the location and type of a specific object in an image and expressing the identified location and type as a bounding box, etc.

In this case, the deep learning module used by the road extraction device 200 of the present disclosure may be pre-trained through multi-task learning. In other words, the deep learning module included in the road extraction device 200 of the present disclosure may be trained so that one deep learning model processes various tasks. At this time, the deep learning model used by the deep learning module of the present disclosure may include an autoencoder, but embodiments of the present disclosure are not limited thereto.

For example, a first deep learning unit included in the road extraction device 200 of the present disclosure may perform segmentation based on the autoencoder, and a second deep learning unit included in the road extraction device 200 of the present disclosure may perform object detection based on the autoencoder. At this time, at least one of the first deep learning unit and the second deep learning unit may include a plurality of encoding units and/or a plurality of decoding units. In this case, each decoding unit may be pre-trained to perform different tasks.

As a specific example, a $1^{st}$-1 decoding unit included in the first deep learning unit may be pre-trained to perform segmentation associated with road surface, road center line, texture representing the texture of the road, road edge representing the edge of the road, road angle (direction) representing the angle of the road, etc. In addition, a $1^{st}$-2 decoding unit included in the first deep learning unit may be pre-trained to perform segmentation associated with not-road marks including buildings, plants, water, etc. In addition, a second decoding unit included in the second deep learning unit may be pre-trained to perform object detection associated with road marks including cars.

At this time, the not-road mark generally refers to an object that is not included in the road. In contrast, the road mark generally refers to an object that is included in the road. The types of the not-road mark and the road mark may be predefined by an administrator of the road extraction device 200 of the present disclosure.

In other words, in the case of an area where the not-road mark (e.g., the building) is detected, the road extraction device 200 of the present disclosure does not determine the area as the road. In the case of an area where the road mark (e.g., the car) is detected, the road extraction device 200 of the present disclosure determines the area as the road. Therefore, the road extraction device 200 of the present disclosure has a new effect of being able to perform more accurate road extraction by using the not-road mark and the road mark, in addition to the effect of the general road extraction method.

A detailed operation process of the road extraction device 200 will be described below.

On the other hand, the communication network 300 serves to connect the external database 100 to the road extraction device 200. That is, the communication network 300 refers to a communication network that provides a connection path through which the road extraction device

200 can transmit and receive data to and from the external database 100. The communication network 300 may include, for example, wired networks, such as local area networks (LANs), wide area networks (WANs), metropolitan area networks (MANs), and integrated service digital networks (ISDNs), or wireless networks, such as wireless LANs, code division multiple access (CDMA), Bluetooth, and satellite communications, but the scope of the present disclosure is not limited thereto.

Hereinafter, the operation of the road extraction device 200 will be described in more detail with reference to FIG. 2.

Figure 2:
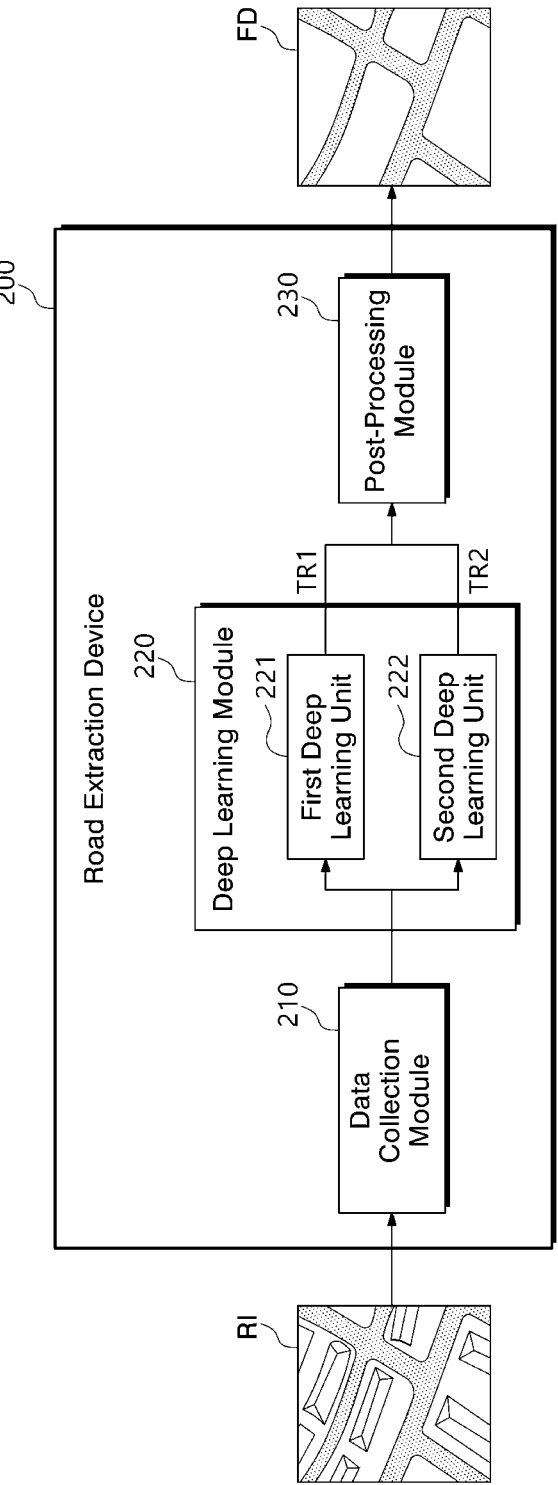
FIG. 2 is a block diagram of the road extraction device in accordance with some embodiments of the present disclosure.

FIG. 2 is a block diagram of the road extraction device in accordance with some embodiments of the present disclosure.

Referring to FIGS. 1 and 2, the road extraction device 200 may receive a road image (hereinafter referred to as "RI") and may generate final data (hereinafter referred to as "FD") by performing road extraction from the received road image RI.

Specifically, the road extraction device 200 may include a data collection module 210, a deep learning module 220, and a post-processing module 230. The deep learning module 220 may include a first deep learning unit 221 and a second deep learning unit 222.

The data collection module 210 may receive the road image RI. In other words, the data collection module 210 may receive the road image RI from the external database 100.

At this time, the road image RI may include a satellite image including road surface. The satellite image may refer to an image captured from an artificial satellite located at a certain height. That is, the road extraction device 200 may receive the road image RI including the satellite image from the external database 100, which is a database that stores, analyzes, and/or manages satellite images that are public data.

The data collection module 210 may transmit the received road image RI to other components within the road extraction device 200. For example, the data collection module 210 may transmit the road image RI to the deep learning module 220, but the present disclosure is not limited thereto.

Various communication modules may be used in the data collection module 210, and data may be exchanged between the external database 100 and the road extraction device 200 through the communication network (300 of FIG. 1).

The deep learning module 220 may perform a task for extracting the road from the road image RI. In other words, the deep learning module 220 may generate a task result (hereinafter referred to "TR") by performing a task associated with road extraction on the road image RI.

In this case, the deep learning module 220 may include a first deep learning unit 221 and a second deep learning unit 222. The first deep learning unit 221 may generate a first task performance result TR1 and the second deep learning unit 222 may generate a second task performance result TR2.

The task performed by the deep learning module 220 may refer to a series of operations performed by the deep learning module 220. In other words, the task may refer to a series of processes or operations in which the deep learning module 220 receives input values and outputs output values in order to derive a certain result.

For example, the deep learning module 220 may perform a task associated with computer vision on road images. In other words, the deep learning module 220 may perform a task associated with image analysis of road images. For example, the deep learning module 220 may perform segmentation and object detection associated with characteristics of the road on the road image. At this time, the segmentation refers to a task of classifying which class each pixel in an image belongs to, and the object detection refers to a task of identifying the location and type of a specific object in an image and expressing the identified location and type as a bounding box, etc.

At this time, the deep learning module 220 may be trained based on machine learning.

In more detail, deep learning technology, which is a type of machine learning, learns down to a deep level in multiple stages on the basis of data. In other words, deep learning represents a set of machine learning algorithms that extract key data from a plurality of data at increasing levels.

As some examples, the deep learning module 220 may use various known deep learning structures. For example, the deep learning module 220 may use a structure such as a convolutional neural network (CNN), a recurrent neural network (RNN), a deep belief network (DBN), a graph neural network (GNN), a generative adversarial network (GAN), a transformer, an autoencoder, etc.

Specifically, the CNN is a model that simulates a human brain function on the assumption that when a person recognizes an object, the basic features of the object are extracted, and then, the object is recognized on the basis of the result of complex calculation in the brain. The CNN may include known structures such as LeNet, AlexNet, VGGNet, GoogleNet, and ResNet, but the present disclosure is not limited thereto.

The RNN is widely used in natural language processing, etc., and is an effective structure for processing time-series data that changes over time. The RNN can construct an artificial neural network structure by stacking up layers at each moment.

The DBN is a deep learning structure including multiple layers of Restricted Boltzman Machine (RBM), which is a deep learning technique. When a certain number of layers are obtained by repeating RBM learning, the DBN having a corresponding number of layers may be configured.

The GNN represents an artificial neural network structure implemented in a method of deriving similarities and feature points between modeling data by using modeling data modeled on the basis of data mapped between specific parameters.

The GAN represents an artificial neural network structure that uses a generative neural network and a discriminative neural network to generate new data in a similar form to input data. The GAN may include a known deep convolutional GAN (DCGAN), conditional GAN (CGAN), Wasserstein GAN (WGAN), Style-Based GAN (StyleGAN), CycleGAN, etc., but embodiments of the present disclosure are not limited thereto.

The transformer is an artificial neural network with an encoder-decoder structure that utilizes attention, and may grasp the overall meaning between an input sequence and an output sequence. The transformer may use an attention mechanism to ensure that all elements of the input sequence affect the output sequence, allowing both the encoder and the decoder to consider the entire sequence. The transformer may patch images and use the images as input, as well as natural language and time-series data.

The autoencoder is a deep learning structure that extracts and reconstructs data features. Typically, the autoencoder includes an encoder that compresses input values and a decoder that reconstructs compressed data. The encoder converts the input value into a low-dimensional latent representation, and the decoder reconstructs the latent representation to the same dimension as the input value. At this time, the encoder and the decoder may each be composed of a multilayer perceptron (MLP). When learning the autoencoder, input data is input, and weights and biases are learned to minimize the difference between an output value and an input value. The autoencoder learned in this way may well extract the features of input data and reconstruct noisy input data. The autoencoder may be mainly used in fields such as data compression, dimensionality reduction, noise cancellation, and data generation, and may also be used in fields such as image recognition, natural language processing, and voice recognition.

On the other hand, the artificial neural network learning of the deep learning module 220 may be performed by adjusting a weight of a connection line between nodes (and adjusting a bias value if necessary) so that a desired output is produced for a given input. In addition, the artificial neural network may continuously update a weight value by learning. In addition, a method such as back propagation may be used in the artificial neural network learning.

In this case, unsupervised learning, semi-supervised learning, and supervised learning may be used as machine learning methods of the artificial neural network. In addition, the deep learning module 220 may be controlled to automatically update the artificial neural network structure for outputting analysis data according to settings.

In this case, the deep learning module 220 in accordance with some embodiments of the present disclosure may be pre-trained through multi-task learning. In other words, the deep learning module 220 may be trained so that one deep learning model processes various tasks. At this time, the deep learning model used by the deep learning module of the present disclosure may include an autoencoder, but embodiments of the present disclosure are not limited thereto.

For example, the first deep learning unit 221 may perform segmentation based on the autoencoder, and the second deep learning unit 222 may perform object detection based on the autoencoder. At this time, at least one of the first deep learning unit and the second deep learning unit may include a plurality of encoding units and/or a plurality of decoding units. In this case, each decoding unit may be pre-trained to perform different tasks.

As a specific example, a $1^{st}$-1 decoding unit included in the first deep learning unit 221 may be pre-trained to perform segmentation associated with road surface, road center line, texture representing the texture of the road, road edge representing the edge of the road, road angle (direction) representing the angle of the road, etc. In addition, a $1^{st}$-2 decoding unit included in the first deep learning unit 221 may be pre-trained to perform segmentation associated with not-road marks including buildings, plants, water, etc. In addition, a second decoding unit included in the second deep learning unit 222 may be pre-trained to perform object detection associated with road marks including cars.

At this time, the not-road mark generally refers to an object that is not included in the road. In contrast, the road mark generally refers to an object that is included in the road. The types of the not-road mark and the road mark may be predefined by an administrator of the road extraction device 200 of the present disclosure.

In other words, in the case of an area where the not-road mark (e.g., the building) is detected, the deep learning module 220 of the present disclosure does not determine the area as the road. In the case of an area where the road mark (e.g., the car) is detected, the deep learning module 220 of the present disclosure determines the area as the road. Therefore, the deep learning module 220 of the present disclosure has a new effect of being able to perform more accurate road extraction by using the not-road mark and the road mark, in addition to the effect of the general road extraction method.

Hereinafter, the neural network structure of the deep learning module 220 in accordance with some embodiments of the present disclosure will be described in more detail with reference to FIG. 3A.

Figure 3A:
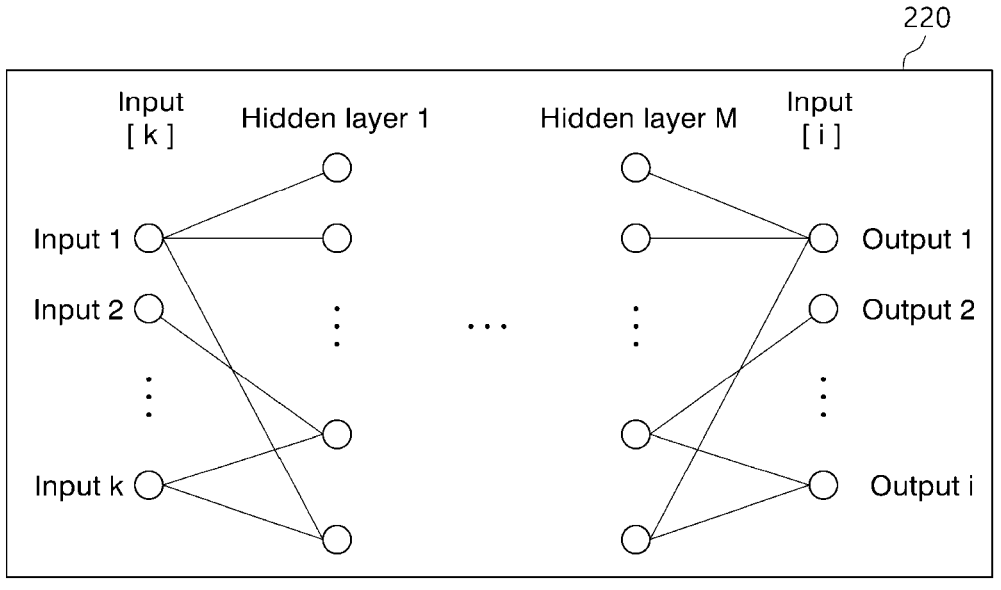
FIG. 3A is a diagram for describing the neural network structure of the deep learning module in accordance with some embodiments of the present disclosure.

FIG. 3A is a diagram for describing the neural network structure of the deep learning module in accordance with some embodiments of the present disclosure.

Referring to FIG. 3A, the deep learning module 220 in accordance with some embodiments of the present disclosure may include an input layer (input) with a road image as an input node, an output layer (output) that uses a task performance result as an output node, M hidden layers disposed between the input layer and the output layer.

Here, a weight may be set to an edge that connects the nodes of the respective layers. The presence or absence of the weight or the edge may be added, removed, or updated in a learning process. Therefore, through the learning process, weights of nodes and edges between k input nodes and i output nodes may be updated.

All nodes and edges may be set to initial values before the deep learning module 220 performs learning. However, when information is input cumulatively, the weights of the nodes and the edges are changed. In this process, matching may be made between parameters (road images) input as learning factors and values assigned to the output nodes (task performance result).

Additionally, when using a cloud server, the deep learning module 220 may receive and process a large number of parameters. Therefore, the deep learning module 220 may perform learning on the basis of massive data.

The weights of the nodes and edges between the input node and the output node constituting the deep learning module 220 may be updated by the learning process of the deep learning module 220. In addition, of course, the parameters input or output from the deep learning module 220 may be additionally extended to various data other than road image and the task performance result.

Hereinafter, the autoencoder used in the present disclosure will be described in more detail with reference to FIG. 3B.

Figure 3B:
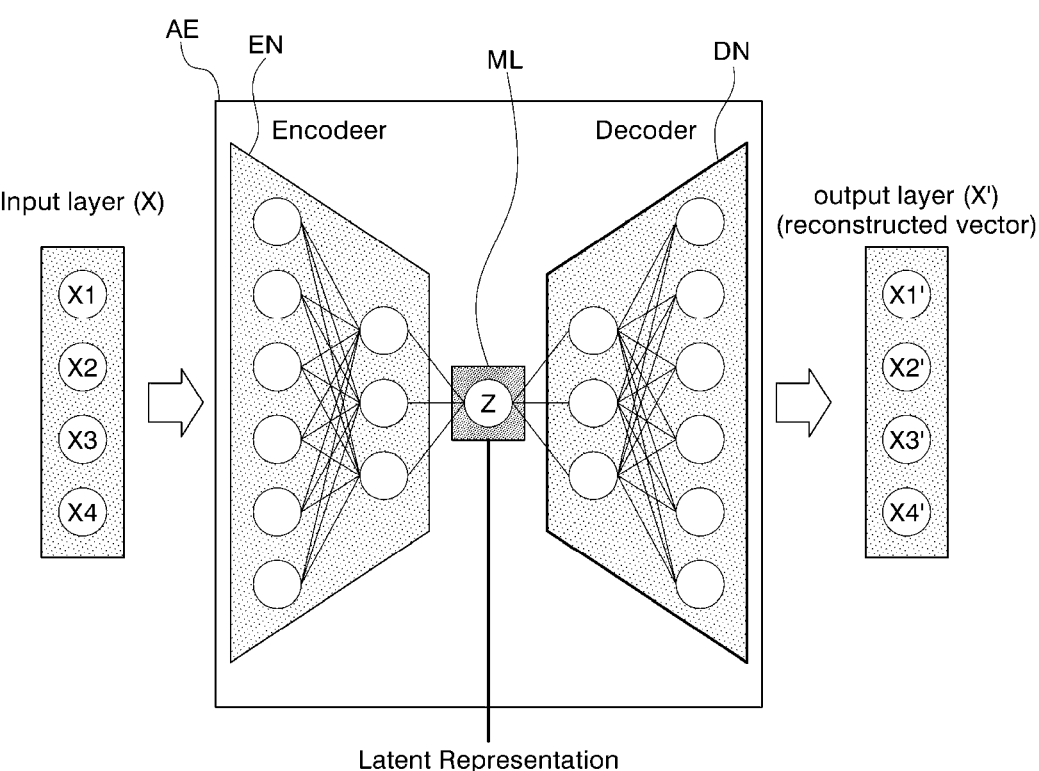
FIG. 3B is a diagram for describing the autoencoder in accordance with some embodiments of the present disclosure.

FIG. 3B is a diagram for describing the autoencoder in accordance with some embodiments of the present disclosure.

Referring to FIG. 3B, the autoencoder (hereinafter referred to as "AE") may include an encoder network (hereinafter referred to as an encoder unit EN) and a decoder network (hereinafter referred to a decoder unit DN) and may include a middle layer ML disposed between the encoder unit EN and the decoder unit DN.

The autoencoder AE is a type of deep neural network model that reduces data by compressing data (i.e., input data) received through the encoder unit EN, uses the decoder unit DN to convert the reduced data into the same size as the input data in the encoder unit EN, and outputs the converted data, so that the output data of the autoencoder AE is made to be the same as the input data.

The autoencoder AE learns the features of input data in an unsupervised manner. To this end, the autoencoder AE may convert data input through the encoder unit EN into low-dimensional data (latent representation) that well expresses the relevant characteristics, and may reconstruct the converted data back to the original data through the decoder unit DN.

The autoencoder AE may learn patterns inherent in the original data so as to minimize a reconstruction error corresponding to the difference between raw data X1, X2, X3, and X4, that is, input data (road image) and reconstructed data X1', X2', X3', and X4', that is, output data (task performance result).

Hereinafter, the structure of the deep learning module 220 in accordance with some embodiments of the present disclosure will be described with reference to FIGS. 4A and 4B. That is, hereinafter, the structures of the first deep learning unit 221 and the second deep learning unit 222 implemented through the autoencoder described above will be described with reference to FIGS. 4A and 4B.

FIGS. 4A to 4D are diagrams for describing the structures of the first deep learning unit and the second deep learning unit in accordance with some embodiments of the present disclosure.

Referring to FIGS. 4A to 4D, as described above, the deep learning module 220 in accordance with some embodiments of the present disclosure may be pre-trained based on multi-task learning. In order to implement this, the deep learning module 220 may be designed to be separated into the first deep learning unit 221 and the second deep learning unit 222. At this time, at least one of the first deep learning unit 221 and the second deep learning unit 222 may include a plurality of encoder units and/or a plurality of decoder units.

Figure 4A:
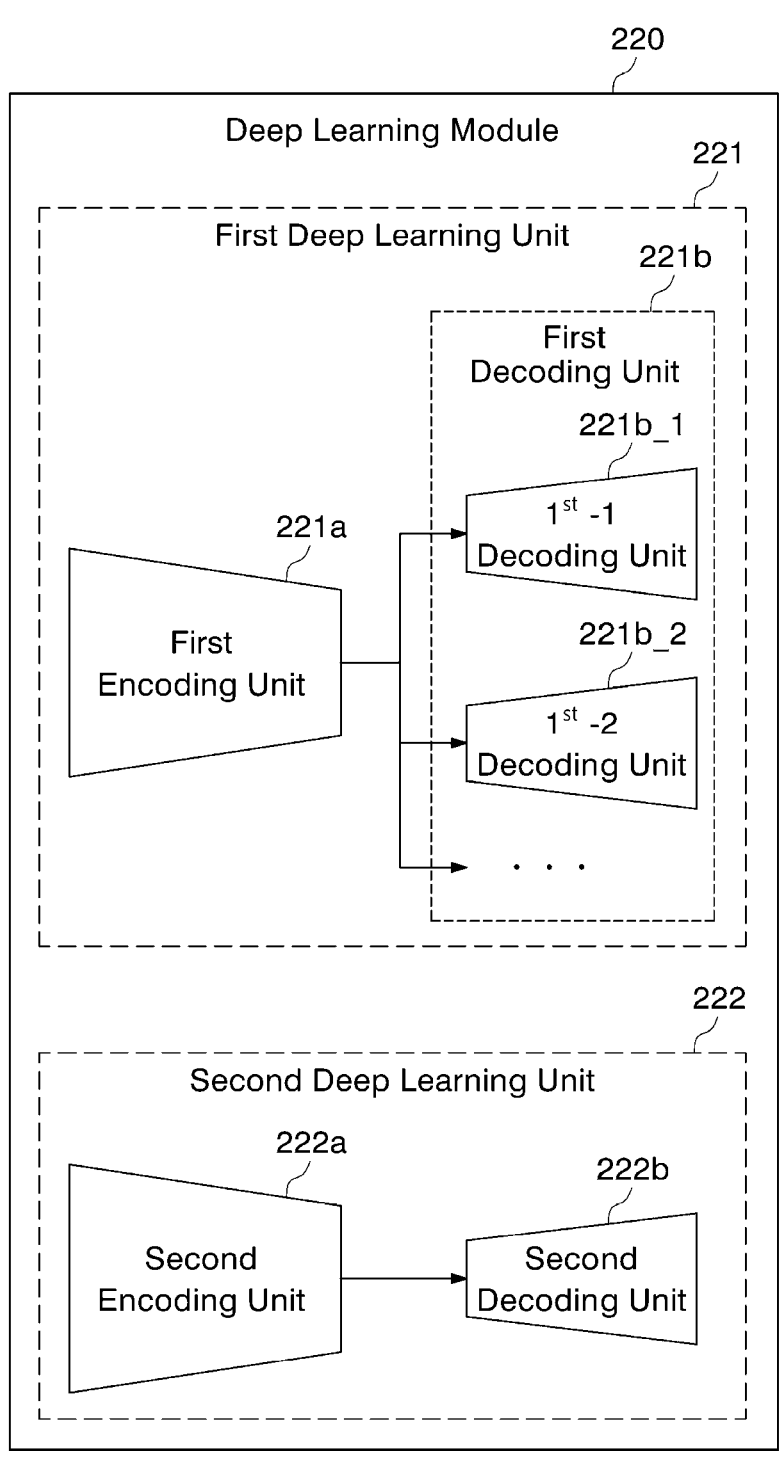
FIG. 4A illustrates that the deep learning module 220 is designed to be separated into the first deep learning unit 221 and the second deep learning unit 222.

To be specific, FIG. 4A illustrates that the deep learning module 220 is designed to be separated into the first deep learning unit 221 and the second deep learning unit 222. At this time, the first deep learning unit 221 and the second deep learning unit 222 include encoding units 221a and 222a and decoding units 221b and 222b, respectively. The first decoding unit 221b are designed to be separated into a $1^{st}$-1 decoding unit 221b_1 and a $1^{st}$-2 decoding unit 221b_2.

Figure 4B:
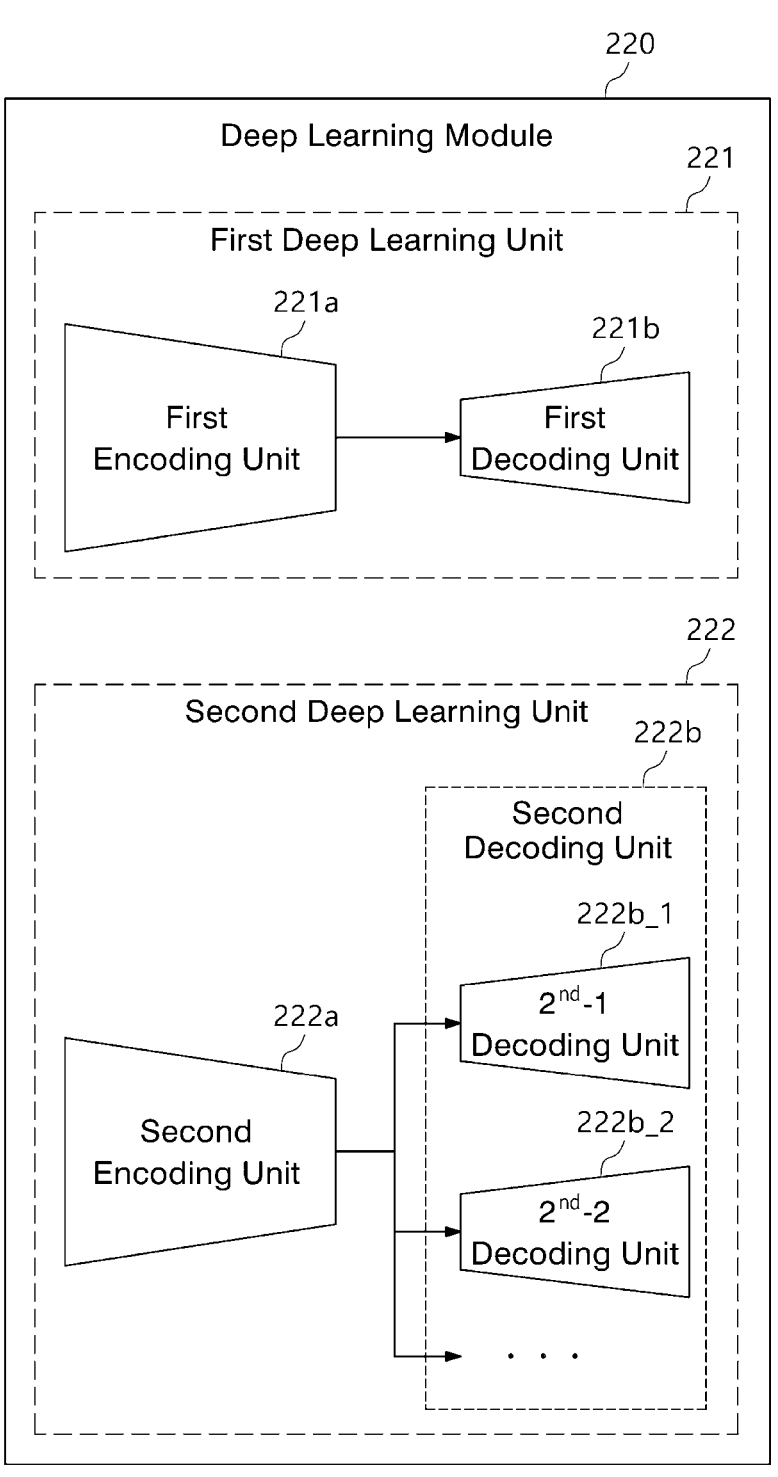
FIG. 4B illustrates that the deep learning module 220 is designed to be separated into the first deep learning unit 221 and the second deep learning unit 222.

FIG. 4B illustrates that the deep learning module 220 is designed to be separated into the first deep learning unit 221 and the second deep learning unit 222. At this time, the first deep learning unit 221 and the second deep learning unit 222 include encoding units 221a and 222a and decoding units 221b and 222b, respectively. The second decoding unit 222b are designed to be separated into a $2^{nd}$-1 decoding unit 222b_1 and a $2^{nd}$-2 decoding unit 222b_2.

Figure 4C:
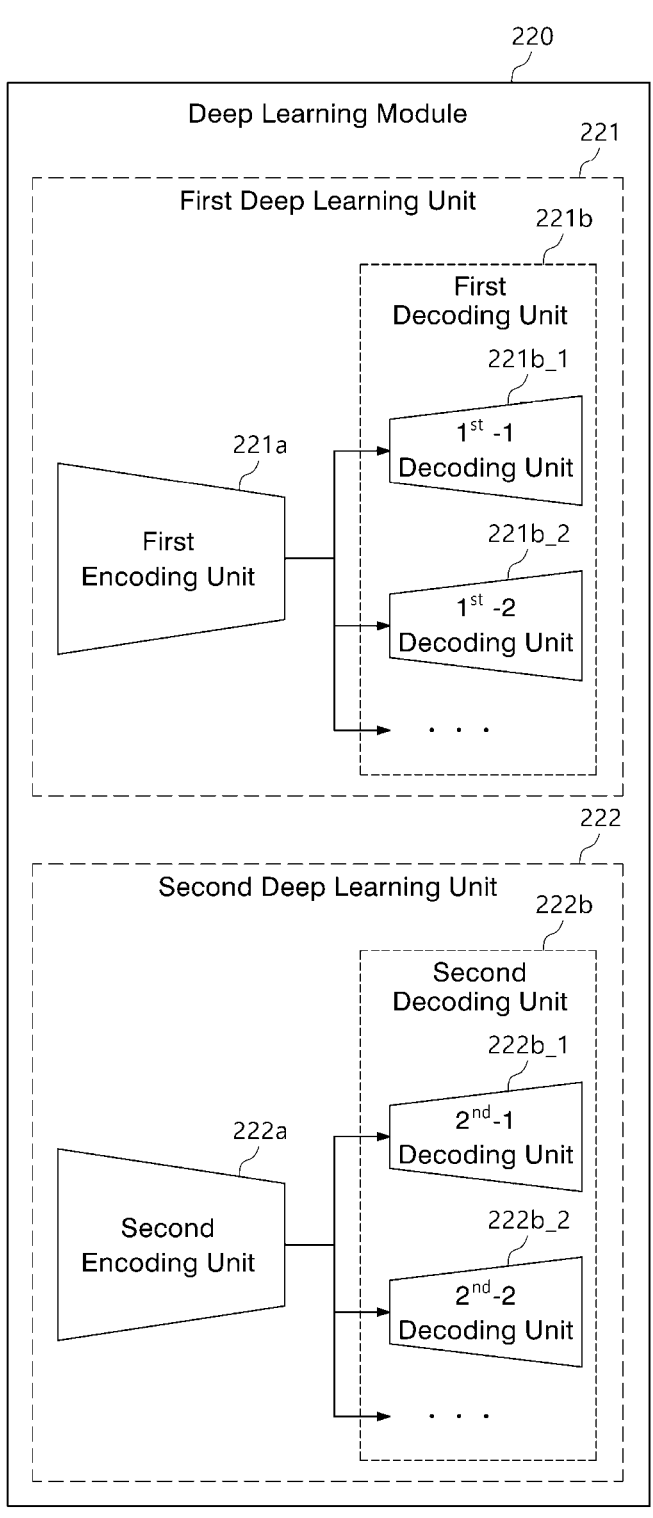
FIG. 4C illustrates that the deep learning module 220 is designed to be separated into the first deep learning unit 221 and the second deep learning unit 222.

FIG. 4C illustrates that the deep learning module 220 is designed to be separated into the first deep learning unit 221 and the second deep learning unit 222. At this time, the first deep learning unit 221 and the second deep learning unit 222 include encoding units 221a and 222a and decoding units 221b and 222b, respectively. The first decoding unit 221b are designed to be separated into a $1^{st}$-1 decoding unit 221b_1 and a $1^{st}$-2 decoding unit 221b_2. The second decoding unit 222b are designed to be separated into a $2^{nd}$-1 decoding unit 222b_1 and a $2^{nd}$-2 decoding unit 222b_2.

Figure 4D:
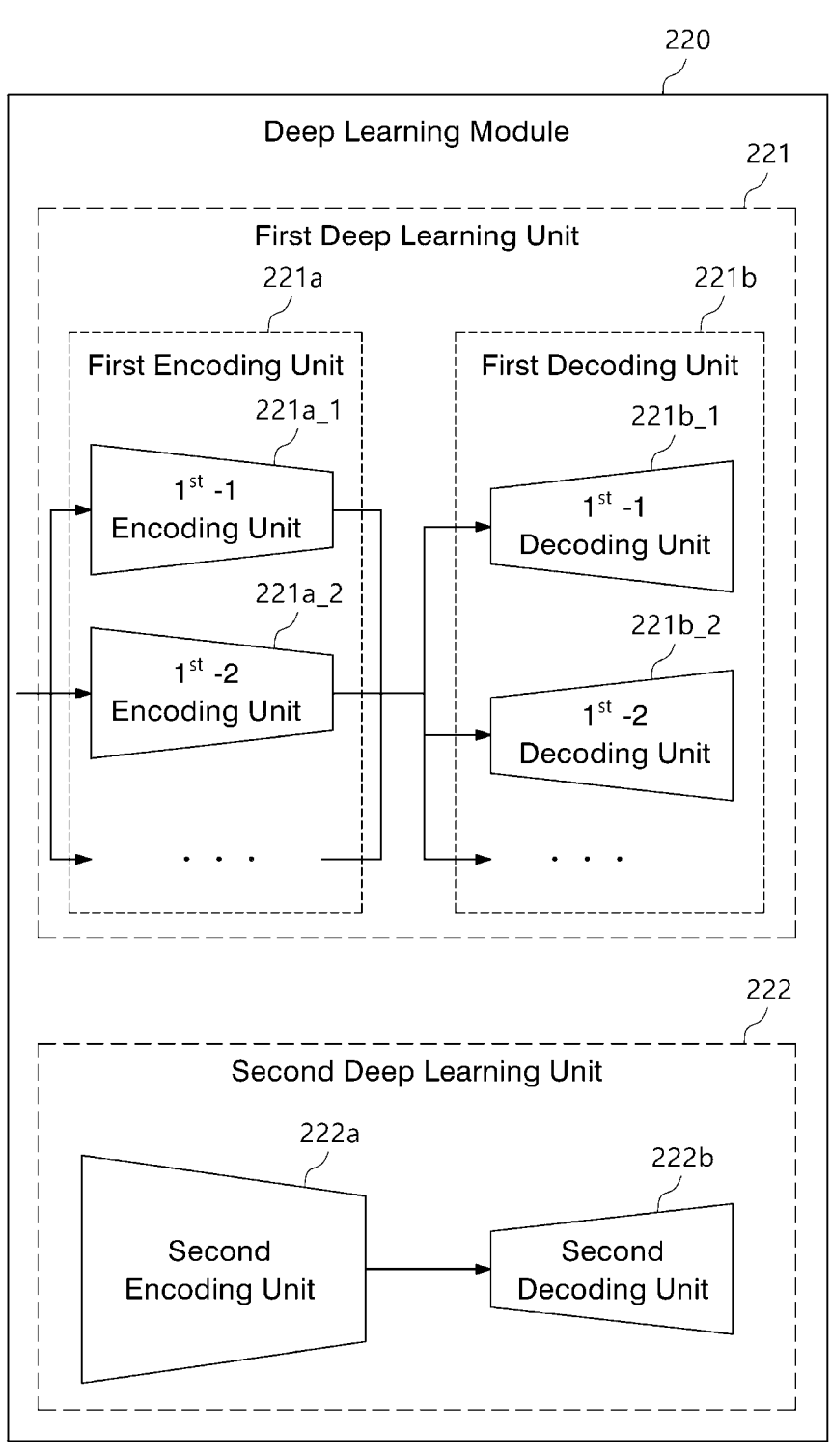
FIG. 4D illustrates that the deep learning module 220 is designed to be separated into the first deep learning unit 221 and the second deep learning unit 222.

FIG. 4D illustrates that the deep learning module 220 is designed to be separated into the first deep learning unit 221 and the second deep learning unit 222. At this time, the first deep learning unit 221 and the second deep learning unit 222 include encoding units 221a and 222a and decoding units 221b and 222b, respectively. The first encoding unit 221a are designed to be separated into a $1^{st}$-1 encoding unit 221a_1 and a $1^{st}$-2 encoding unit 221a_2. The second decoding unit 222b are designed to be separated into a $2^{nd}$-1 decoding unit 222b-1 and a $2^{nd}$-2 decoding unit 222b-2.

At this time, a plurality of encoding units and/or a plurality of decoding units may be pre-trained to perform different tasks. The deep learning module 220 of the present disclosure, which performs multi-task learning through this structure, may process various tasks through one deep learning model (autoencoder).

Hereinafter, a specific example of the multi-task learning method of the deep learning module 220 of the present disclosure will be described with reference to FIG. 5. At this time, for convenience of explanation, the structure of the deep learning module 220 of the present disclosure for implementing multi-task learning will be described on the assumption of the structure illustrated in FIG. 4A.

Figure 5:
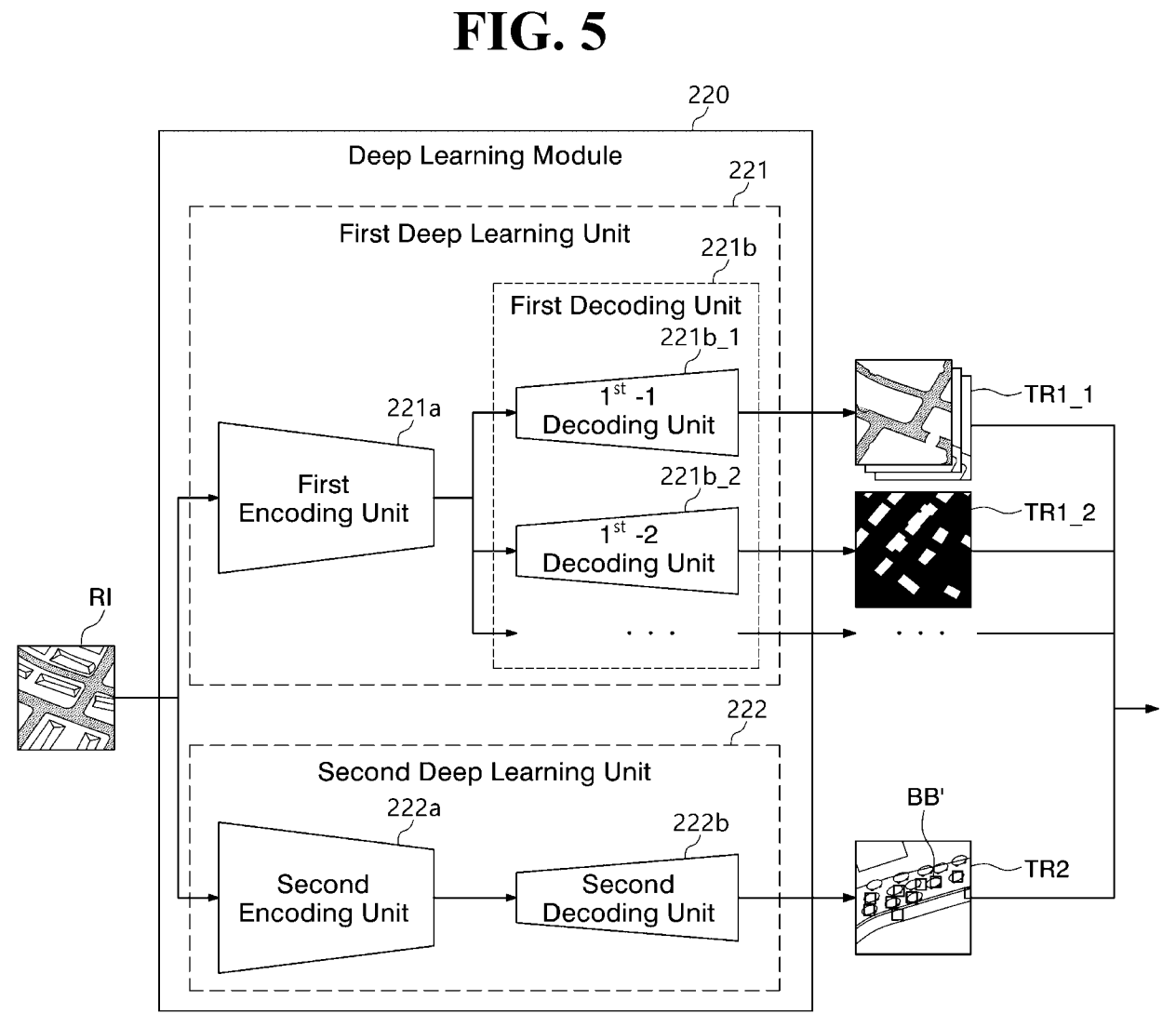

FIG. 5 is a conceptual diagram for describing the operation of the deep learning module in accordance with some embodiments of the present disclosure. Specifically, FIG. 5 illustrates an operating method when the deep learning module 220 of the present disclosure has the structure illustrated in FIG. 4A.

Referring to FIG. 5, the deep learning module 220 in accordance with some embodiments of the present disclosure may include a first deep learning unit 221 and a second deep learning unit 222. At this time, the first deep learning unit 221 and the second deep learning unit 222 may include encoding units 221a and 222a and decoding units 221b and 222b, respectively.

The first deep learning unit 221 may perform segmentation on a road image RI through the first encoding unit 221a and the first decoding unit 221b, and the second deep learning unit 222 may perform object detection on a road image RI through the second encoding unit 222a and the second decoding unit 222b. The segmentation refers to a task of classifying which class each pixel in the road image RI belongs to, and the object detection refers to a task of identifying the location and type of a specific object in the road image RI and expressing the identified location and type as a bounding box BB, etc.

As some examples, the first encoding unit 221a included in the first deep learning unit 221 may be pre-trained to perform segmentation, and the second encoding unit 222a included in the second deep learning unit 222 may be pre-trained to perform object detection. At this time, the first encoding unit 221a and the second encoding unit 222a may have different encoder structures to perform the respective tasks. For example, the first encoding unit 221a and the second encoding unit 222a may be pre-trained so that the neural network depth, the presence or absence of downsampling, the type of included layers, the presence or absence of skip connection, etc. are different.

In order to implement the above-described multi-task learning, the first decoding unit 221b of the present disclosure may include a plurality of decoding units 221b_1, 221b_2, etc. In other words, the first decoding unit 221b of the present disclosure may include a $1^{st}$-1 decoding unit 221b_1, a $1^{st}$-2 decoding unit 221b_2, etc.

At this time, the decoding units 221b_1, 221b_2, etc. included in the first decoding unit 221b may be pre-trained to perform different tasks. In other words, the first deep learning unit 221 is trained to perform segmentation. At this time, the decoding units 221b_1, 221b_2, etc. included in the first decoding unit 221b may be pre-trained to perform different segmentation tasks during segmentation.

As a specific example, the $1^{st}$-1 decoding unit 221b_1 included in the first deep learning unit 221 may be pre-trained to perform segmentation associated with road surface, road center line, texture representing the texture of the road, road edge representing the edge of the road, road angle (direction) representing the angle of the road, etc.

A task performance result TR1_1 of the $1^{st}$-1 decoding unit 221b_1 illustrated in FIG. 5 shows a case where the first encoding unit 221a converts the road image RI into a latent representation, and then, the $1^{st}$-1 decoding unit $221b\_1$ performs segmentation on the road surface for the corresponding latent representation.

In addition, the $1^{st}$-2 decoding unit $221b\_2$ included in the first deep learning unit 221 may be pre-trained to perform segmentation associated with not-road marks including buildings, plants, water, etc. At this time, the not-road mark generally refers to an object that is not included in the road. The type of the not-road mark may be predefined by an administrator of the road extraction device 200 of the present disclosure.

A task performance result TR1_2 of the $1^{st}$-2 decoding unit $221b\_2$ illustrated in FIG. 5 shows a case where the first encoding unit $221a$ converts the road image RI into a latent representation, and then, the $1^{st}$-2 decoding unit $221b\_2$ performs segmentation on a building, which is an example of the not-road mark.

In order to perform different segmentation tasks as described above, the $1^{st}$-1 decoding unit $221b\_1$ and the $1^{st}$-2 decoding unit $221b\_2$ of the present disclosure may have different decoder structures. For example, the $1^{st}$-1 decoding unit $221b\_1$ and the $1^{st}$-2 decoding unit $221b\_2$ may be different in the decoder neural network structure (architecture), the type of loss function, the presence and type of normalization function, the type of activation function, etc. At this time, the neural network structure may include the number of output layers, the type of included layers (e.g., U-Net, Fully Connected Layer (FCL)), etc.

On the other hand, the second decoding unit included in the second deep learning unit 222 may be pre-trained to perform object detection associated with the road mark. At this time, the road mark generally refers to an object that is included in the road. The type of the road mark may be predefined by an administrator of the road extraction device 200 of the present disclosure.

A task performance result TR2 of the second decoding unit $222b$ illustrated in FIG. 5 shows a case where the second encoding unit $222a$ converts the road image RI into a latent representation, and then, the second decoding unit $222b$ performs object detection associated with a car, which is an example of the road mark. As a result of object detection, FIG. 5 illustrates that the task performance result TR2 includes the bounding box BB.

The deep learning module 220 of the present disclosure, in which such multi-task learning is performed, may process various tasks through one deep learning model (autoencoder).

In summary, the deep learning module 220 of the present disclosure may detect road surface, road center line, texture representing the texture of the road, road edge representing the edge of the road, road angle (direction) representing the angle of the road, etc. Then, in the case of an area where a not-road mark (e.g., a building) is detected, the deep learning module 220 of the present disclosure may not determine the area as a road. In the case of an area where a road mark (e.g., a car) is detected, the deep learning module 220 of the present disclosure may determine the area as a road. Accordingly, the deep learning module 220 of the present disclosure has a new effect of being able to perform more accurate road extraction by using not-road marks and road marks, in addition to the effect of the general road extraction method.

Referring again to FIGS. 1 and 2, the deep learning module 220 may transmit the task performance results TR1 and TR2 to the post-processing module 230. In other words, the first deep learning unit 221 may transmit the first task performance result TR1 to the post-processing module 230, and the second deep learning unit 222 may transmit the second task performance result TR2 to the post-processing module 230.

The post-processing module 230 may generate final data FD based on the task performance results of the deep learning module 220. In other words, the post-processing module 230 may generate the final data FD based on the first task performance result TR1 and the second task performance result TR2.

Hereinafter, the operation of the post-processing module 230 in accordance with some embodiments of the present disclosure will be described in more detail with reference to FIG. 6.

Figure 6:
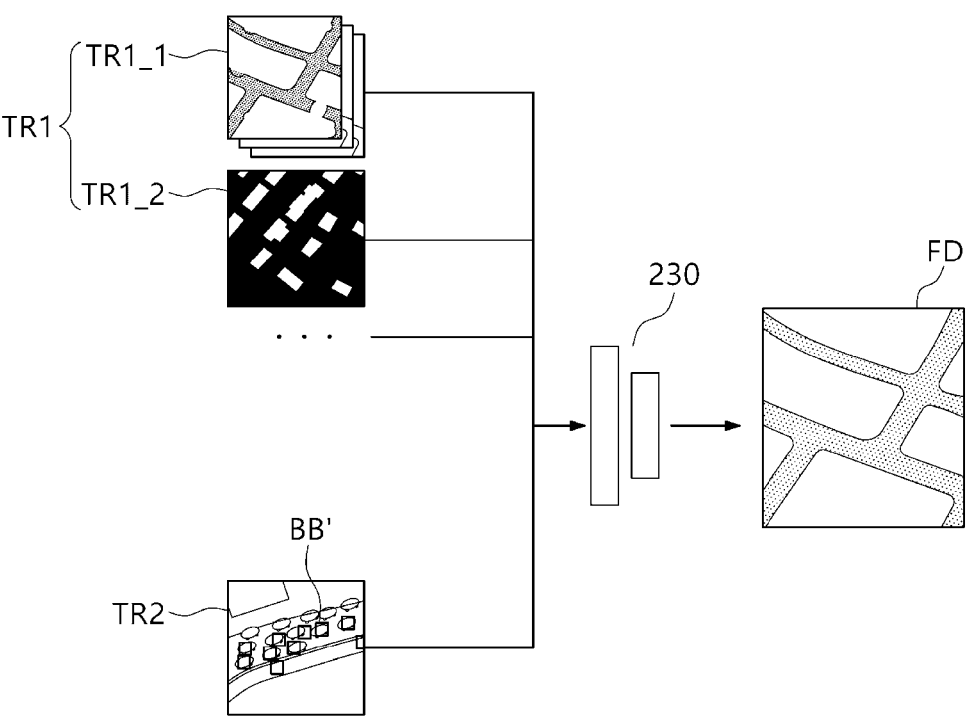
FIG. 6 is a conceptual diagram for describing the operation of the post-processing module in accordance with some embodiments of the present disclosure.

FIG. 6 is a conceptual diagram for describing the operation of the post-processing module in accordance with some embodiments of the present disclosure.

Referring to FIGS. 2 and 6, the post-processing module 230 may generate final data FD by merging the first task performance result TR1 and the second task performance result TR2 and then processing the merged result. At this time, in order to implement multi-task learning as described above, the first decoding unit ($221b$ in FIG. 5) may be implemented as a plurality of decoding units ($221b\_1$ and $221b\_2$ in FIG. 5). Accordingly, the first task performance result TR1 may include a $1^{st}$-1 task performance result TR1_1 and a $1^{st}$-2 task performance result TR1_2.

As some examples, the post-processing module 230 may generate the final data FD by merging the first task performance result TR1 and the second task performance result TR2 and then processing the merged result. For example, the post-processing module 230 may include a refinement network and generate final data FD through the refinement network.

At this time, when an unconnected area related to a road exists, the post-processing module 230 may convert the unconnected area into a connected area. In other words, when an unconnected area exists in the result of merging the first task performance result TR1 and the second task performance result TR2, the post-processing module 230 may convert the unconnected area into a connected area.

As an example, the post-processing module 230 may convert an unconnected area into a connected area by performing general noise cancellation techniques, smoothing, binarization, morphological operations, etc. However, embodiments of the present disclosure are not limited thereto.

Figure 7:
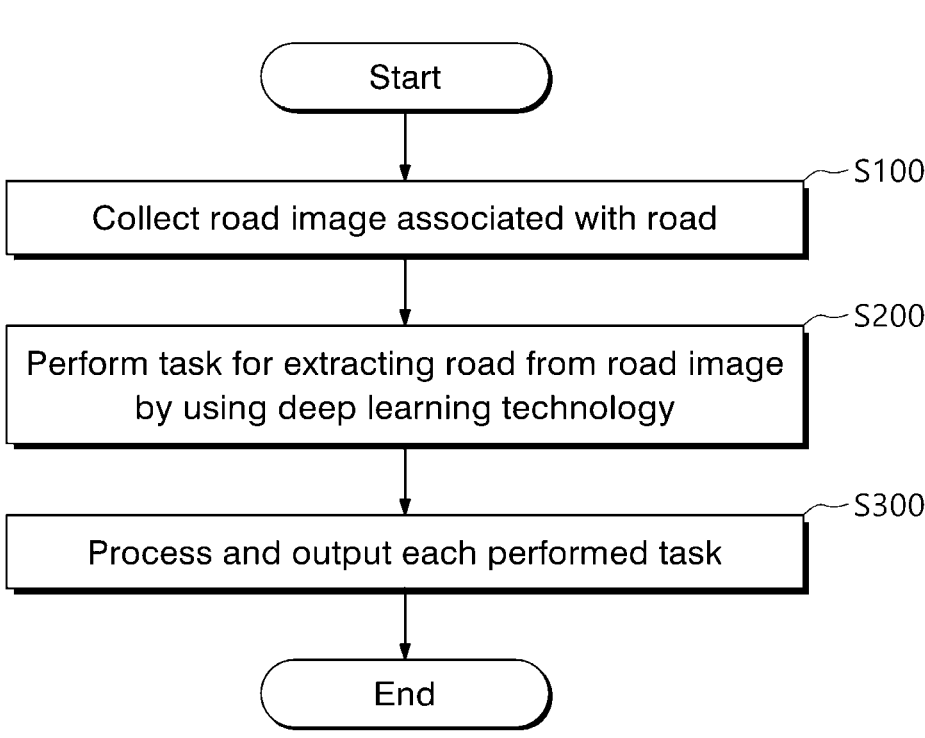
FIG. 7 is a flowchart of a road extraction method in accordance with some embodiments of the present disclosure.

FIG. 7 is a flowchart of a road extraction method in accordance with some embodiments of the present disclosure. Operations S100 to S300 in FIG. 7 may be performed by the road extraction device (200 in FIGS. 1 and 2). Hereinafter, redundant parts are omitted and brief description is given.

Referring to FIGS. 1, 2, and 7, a road image associated with a road may be collected at S100.

As some examples, the data collection module 210 may receive the road image RI. In other words, the data collection module 210 may receive the road image RI from the external database 100.

At this time, the road image RI may include a satellite image including road surface. The satellite image may refer to an image captured from an artificial satellite located at a certain height. That is, the road extraction device 200 may receive the road image RI including the satellite image from the external database 100, which is a database that stores, analyzes, and/or manages satellite images that are public data.

Next, a task for extracting the road from the road image may be performed by using deep learning technology at S200.

The task performed by the deep learning module 220 may refer to a series of operations performed by the deep learning module 220. In other words, the task may refer to a series of processes or operations in which the deep learning module 220 receives input values and outputs output values in order to derive a certain result. For example, the deep learning module 220 may perform a task associated with computer vision on road images. In other words, the deep learning module 220 may perform a task associated with image analysis of road images. For example, the deep learning module 220 may perform segmentation and object detection associated with characteristics of the road on the road image. At this time, the segmentation refers to a task of classifying which class each pixel in an image belongs to, and the object detection refers to a task of identifying the location and type of a specific object in an image and expressing the identified location and type as a bounding box, etc. In this case, the deep learning module 220 may include the first deep learning unit 221 and the second deep learning unit 222. The first deep learning unit 221 may generate the first task performance result TR1 and the second deep learning unit 222 may generate the second task performance result TR2.

As some examples, the deep learning module 220 in accordance with some embodiments of the present disclosure may be pre-trained through multi-task learning. In other words, the deep learning module 220 may be trained so that one deep learning model processes various tasks. At this time, the deep learning model used by the deep learning module of the present disclosure may include an autoencoder, but embodiments of the present disclosure are not limited thereto.

For example, the first deep learning unit 221 may perform segmentation based on the autoencoder, and the second deep learning unit 222 may perform object detection based on the autoencoder. At this time, at least one of the first deep learning unit and the second deep learning unit may include a plurality of encoding units and/or a plurality of decoding units. In this case, each decoding unit may be pre-trained to perform different tasks.

As a specific example, the $1^{st}$-1 decoding unit included in the first deep learning unit 221 may be pre-trained to perform segmentation associated with road surface, road center line, texture representing the texture of the road, road edge representing the edge of the road, road angle (direction) representing the angle of the road, etc. In addition, the $1^{st}$-2 decoding unit included in the first deep learning unit 221 may be pre-trained to perform segmentation associated with not-road marks including buildings, plants, and water, etc. In addition, the second decoding unit included in the second deep learning unit 222 may be pre-trained to perform object detection associated with road marks including cars.

At this time, the not-road mark generally refers to an object that is not included in the road. In contrast, the road mark generally refers to an object that is included in the road. The types of the not-road mark and the road mark may be predefined by an administrator of the road extraction device 200 of the present disclosure.

In other words, in the case of an area where the not-road mark (e.g., the building) is detected, the deep learning module 220 of the present disclosure does not determine the area as the road. In the case of an area where the road mark (e.g., the car) is detected, the deep learning module 220 of the present disclosure determines the area as the road. Therefore, the deep learning module 220 of the present disclosure has a new effect of being able to perform more accurate road extraction by using the not-road mark and the road mark, in addition to the effect of the general road extraction method.

Subsequently, each performed task may be post-processed and output at S300.

As some examples, the post-processing module 230 may generate final data FD based on the task performance results of the deep learning module 220. In other words, the post-processing module 230 may generate the final data FD based on the first task performance result TR1 and the second task performance result TR2.

For example, the post-processing module 230 may generate the final data FD by merging the first task performance result TR1 and the second task performance result TR2 and then processing the merged result. For example, the post-processing module 230 may include a refinement network and generate final data FD through the refinement network.

At this time, when an unconnected area related to a road exists, the post-processing module 230 may convert the unconnected area into a connected area. In other words, when an unconnected area exists in the result of merging the first task performance result TR1 and the second task performance result TR2, the post-processing module 230 may convert the unconnected area into a connected area.

Figure 8:
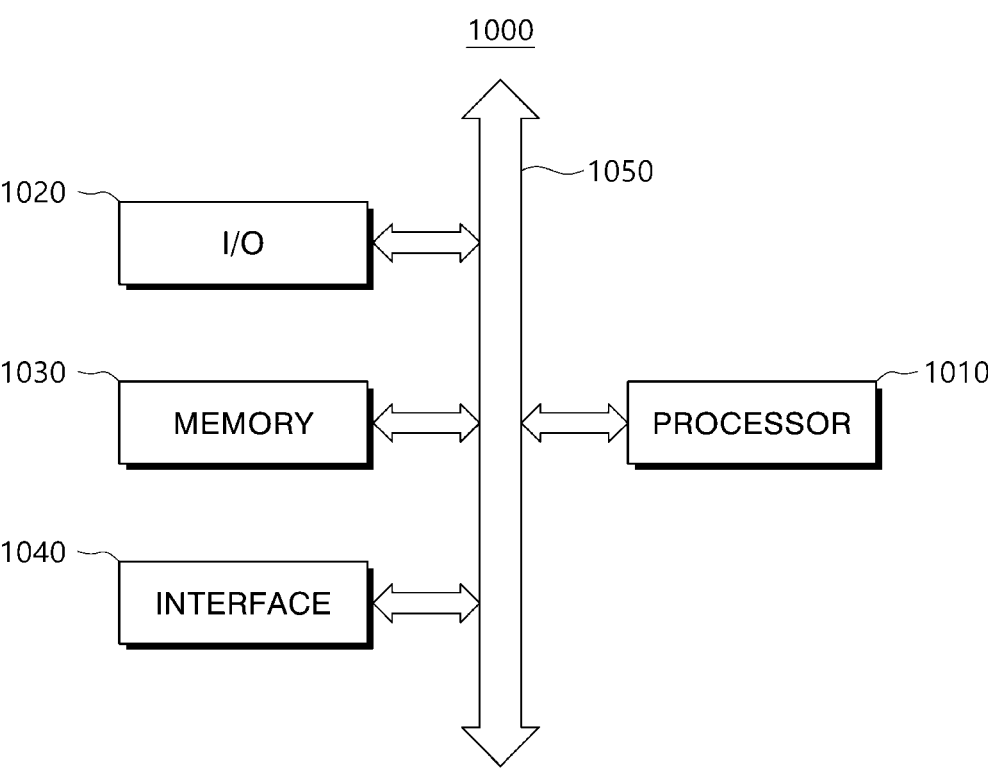
FIG. 8 is a diagram illustrating a hardware implementation of a road extraction device that performs a road extraction method in accordance with some embodiments of the present disclosure.

FIG. 8 is a diagram illustrating a hardware implementation of a road extraction device that performs a road extraction method in accordance with some embodiments of the present disclosure.

Referring to FIG. 8, the road extraction device 200 that performs the road extraction method in accordance with some embodiments of the present disclosure may be implemented as an electronic device 1000. The electronic device 1000 may include a controller 1010, an input/output (I/O) device 1020, a memory device 1030, an interface 1040, and a bus 1050. The controller 1010, the I/O device 1020, the memory device 1030, and/or the interface 1040 may be connected to each other through the bus 1050. In this case, the bus 1050 corresponds to a path through which data is moved.

Specifically, the controller 1010 may include at least one of a central processing unit (CPU), a micro processor unit (MPU), a micro controller unit (MCU), a graphic processing unit (GPU), a microprocessor, a digital signal processor, a microcontroller, an application processor (AP), and logic devices that can perform similar functions thereto.

The I/O device 1020 may include at least one of a keypad, a keyboard, a touch screen, and a display device.

The memory device 1030 may store data and/or programs.

The interface 1040 may perform a function of transmitting data to a communication network or receiving data from the communication network. The interface 1040 may be a wired interface or a wireless interface. For example, the interface 1040 may include an antenna or a wired/wireless transceiver. Although not illustrated, the memory device 1030 is an operating memory for improving the operation of the controller 1010 and may further include a high-speed DRAM and/or SRAM. The memory device 1030 may store programs or applications therein.

Alternatively, the road extraction device 200 and the external database 100 in accordance with embodiments of the present disclosure may be systems configured by connecting a plurality of electronic devices 1000 to each other through a network. In this case, the respective modules or combinations of the modules may be implemented as the electronic device 1000. However, the present embodiment is not limited thereto.

Additionally, the road extraction device 200 may be implemented as at least one of a workstation, a data center, an Internet data center (IDC), a direct attached storage (DAS) system, a storage area network (SAN) system, a network attached storage (NAS) system, a redundant array of inexpensive disks or redundant array of independent disks (RAID) system, and an electronic document management (EDMS) system, but the present embodiment is not limited thereto.

In addition, the road extraction device 200 may transmit data to the external database 100 through the network. The network may include a network based on wired Internet technology, wireless Internet technology, and short-range communication technology. The wired Internet technology may include, for example, at least one of a local area network (LAN) and a wide area network (WAN).

The wireless Internet technology may include, for example, at least one of Wireless LAN (WLAN), Digital Living Network Alliance (DMNA), Wireless Broadband (Wibro), World Interoperability for Microwave Access (Wimax), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), and 5G New Radio (NR) technologies. However, the present embodiment is not limited thereto.

The short-range communication technology may include, for example, at least one of Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, Wi-Fi Direct, and 5G NR (New Radio). However, the present embodiment is not limited thereto.

The road extraction device 200 communicating through the network may comply with technical standards and standard communication schemes for mobile communication. For example, the standard communication schemes may include at least one of Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTEA), and 5G New Radio (NR). However, the present embodiment is not limited thereto.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A road extraction device comprising:
   a data collection module configured to collect a road image associated with a road; and
   a deep learning module configured to perform a task for extracting the road from the road image by using deep learning technology,
   wherein the deep learning module comprises:
      a first deep learning unit configured to perform segmentation on the road image; and
      a second deep learning unit configured to perform object detection on the road image,
   wherein the deep learning module is trained through multi-task learning,
   wherein the deep learning module is configured to perform the task by using an autoencoder,
   wherein the first deep learning unit and the second deep learning unit each comprise at least one encoding unit configured to convert the road image into a latent representation by encoding the road image, which is input data, and at least one decoding unit configured to generate output data by converting the latent representation,
   wherein at least one of the first deep learning unit and the second deep learning unit comprises a plurality of decoding units,
   wherein each of the plurality of decoding units is pre-trained to perform different types of tasks, wherein a 1st-1 decoding unit included in the first deep learning unit is configured to perform a task associated with at least one of road surface, road center line, texture representing a texture of the road, road edge representing an edge of the road, and road angle (direction) representing an angle of the road,
      a 1st-2 decoding unit included in the first deep learning unit is configured to perform a task associated with a not-road mark including at least one of a building, a plant, and water, and
      a second decoding unit included in the second deep learning unit is configured to perform a task associated with a road mark including a car.

2. The road extraction device of claim 1, wherein the road image comprises a satellite image associated with the road.

3. The road extraction device of claim 1, further comprising a post-processing module configured to generate final data by merging the tasks performed by the first deep learning unit and the second deep learning unit and then processing the merged tasks.

4. The road extraction device of claim 3, wherein, when an unconnected area associated with the road exists, the post-processing module is configured to convert the unconnected area into a connected area.

\* \* \* \* \*